United States Patent
Chen

(10) Patent No.: US 6,804,406 B1
(45) Date of Patent: Oct. 12, 2004

(54) ELECTRONIC CALIBRATION FOR SEAMLESS TILED DISPLAY USING OPTICAL FUNCTION GENERATOR

(75) Inventor: Chung-Jen Chen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 735 days.

(21) Appl. No.: 09/651,480

(22) Filed: Aug. 30, 2000

(51) Int. Cl.[7] .......................... G06K 9/40; G09G 5/00; H04N 3/22
(52) U.S. Cl. ................... 382/254; 382/275; 382/276; 382/284; 382/294; 345/1.3; 348/745
(58) Field of Search ........................... 382/154, 254, 382/275, 284, 294, 255, 276; 348/189–190, 744–747; 345/418–419, 425, 434, 435, 437, 438, 1.1–1.3; 353/30, 69, 70; 356/391–393

(56) References Cited

U.S. PATENT DOCUMENTS

| | | | |
|---|---|---|---|
| 3,833,764 A | | 9/1974 | Taylor ..................... 178/7.5 D |
| 4,103,435 A | | 8/1978 | Herndon .................... 35/12 N |
| 5,091,773 A | * | 2/1992 | Fouche et al. .............. 348/806 |
| 5,136,390 A | | 8/1992 | Inova et al. ................ 358/231 |
| 5,847,784 A | * | 12/1998 | Finnila et al. ................ 349/73 |
| 5,923,789 A | * | 7/1999 | Avinash ..................... 382/276 |
| 5,956,000 A | * | 9/1999 | Kreitman et al. ............ 345/1.3 |
| 6,151,086 A | * | 11/2000 | Fergason ....................... 349/5 |
| 6,222,593 B1 | * | 4/2001 | Higurashi et al. .......... 348/745 |
| 6,292,171 B1 | * | 9/2001 | Fu et al. ..................... 345/156 |
| 6,411,302 B1 | * | 6/2002 | Chiraz ....................... 345/545 |
| 6,456,339 B1 | * | 9/2002 | Surati et al. ................ 348/745 |
| 6,611,241 B1 | * | 8/2003 | Firester et al. .............. 345/1.3 |

FOREIGN PATENT DOCUMENTS

| | | |
|---|---|---|
| WO | 9914716 A | 3/1999 |
| WO | 9931877 A | 6/1999 |
| WO | 0018139 A | 3/2000 |

OTHER PUBLICATIONS

M. Hereld et al., "Introduction to Building Projection–based Tiled Display Systems," IEEE Computer Graphics and Applications, Jul./Aug. 2000, pp. 22–28.*
Patent Abstracts of Japan, vol. 1998, No. 04, Mar. 31, 1998 & JP 09 326981 A (Olympus Optical Co Ltd), Dec. 16, 1997 Abstract and US 6 222 593 A (Higurashi et al) May 24, 2001.

* cited by examiner

Primary Examiner—Bhavesh M. Mehta
Assistant Examiner—Yubin Hung

(57) ABSTRACT

Calibrating a seamless tiled display image having multiple overlapping discrete images produced by multiple displays includes generating a display-to-screen spatial transformation function to reduce one or more undesirable geometric projector characteristics for each of the projectors used in the tiled display. Then the method includes generating a screen-to-camera spatial transformation function to reduce one or more undesirable geometric camera characteristics for each of the cameras used in capturing the tiled display images used in the calibration. Then the method requires generating a spatial luminance transformation function for effective color calibration for each of the display images in the tiled display. Then the method requires inputting a high-resolution image into a tiled display processor to form the tiled images of the tiled display, segmenting the inputted high-resolution image to form tiled images based on an array of images used in the tiled display, and pre-warping each of the segmented tiled images using the display-to-screen spatial transformation function to reduce the one or more non desirable geometric projector characteristics. Then the method requires applying an inverse of the spatial-luminance transformation function to each of the pre-warped images to effectively blend colors in the tiled display images.

46 Claims, 9 Drawing Sheets

ELECTRONIC CALIBRATION FOR SEAMLESS TILED DISPLAY USING OPTICAL FUNCTION GENERATOR

The invention described herein was made in the performance of work under NASA Contract NAS 1-20219, and is subject to the provisions of Section 305 of the National Aeronautics and Space Act of 1958 (42 U.S.C. 2457). The government may have certain rights in the invention.

FIELD OF THE INVENTION

This invention relates generally to the field of optical displays, and more particularly pertains to calibrating tiled displays using multiple projectors to produce a large, and/or a higher resolution image.

BACKGROUND

Multiple projection displays have been proposed and used for many years. In the 950's, the "CINERAMA" system was developed for the film industry. The CINERAMA system used three films to project three images using three separate projectors, which were then combined to form a single panoramic image. Disneyland continues to use a similar multiple projector system, wherein a circle of projectors shine onto a screen that circles the wall of a round room.

In the video field, multiple projector systems have been proposed and used for a number of specialty applications. U.S. Pat. No. 4,103,435 to Herndon and U.S. Pat. No. 3,833,764 to Taylor suggest using multiple projector systems for flight simulators. In many of these systems, multiple video screens are placed next to each other to form a large tiled image display.

A difficulty with many of the video based multiple projector display systems is that the multiple images often do not appear as one single continuous image on the display screen. When multiple images are projected side-by-side and/or top-to-bottom on a single screen, there is normally a seam or overlapping region between the images for example, an M×N projector array, where M and N are generally expressed as positive integer values, though, in using overlap and portions of displays, fractional values may be assigned. Also M×N projector arrays can be arranged to have constant and identical overlap or can be arranged to have varying degrees of overlap, depending on one's optimization criteria, which can include reliability, fault tolerance, cost and performance. The final display image will either appear as multiple images placed side-by-side with a gap between images or, if the images are made to overlap on a single screen, with a bright line or band there between. In the region of overlap the light from each projector will add to the output light of the other. This applies to the black output level as well. Ideally, when displaying a black image, this region of overlap should be generally uniformly black across the entire displayed image. Instead one generally observes the black image to brighten in the regions of overlap. When the images of two projectors overlap, the amount of light in the overlapped regions of the images is approximately double the amount of light observed on the screen in regions where only a single projector image resides; in regions where four projected images overlap, the amount of light is approximately four times that of the single projector image, and so on. Thus, the observer of the screen will generally see the output image containing objectionable artifacts. The same effects happen for white images, and for all images in between black and white. Generally, the black and the white images may be conceptualized as the upper and lower reference levels for constructing any image whose content spans these two extremes.

The prior art, for example, in the Panoram tiled display resolved overlap issues by requiring the display device to have a black reference level having very low stray light. This needed CRTs, because CRTs have huge native contrast ratios and deep black, several times darker than other common display media such as LCD projectors and DMD projectors. While the deep-dark display or CRT-only architecture might work well for many applications, it fails to meet requirements found in the cinematic, medical and other industries demanding high image quality and performance. In these high performance applications, the contrast ratio requirements often exceed 1000:1. The cinema industry generally requires 1500:1, and the medical industry generally requires displays for digital radiography having contrast ratios in the range of about 2000:1 to 4000:1. With the contrast ratio of CRTs at that or a lesser range, any overlapping strategy as used in the CRT-only architecture fails. It divides the contrast ratio by the number of CRTs used. Thus, for a cinematic application requiring a contrast ratio of 1500:1, any overlap of the CRTs will shrink the contrast ratio to 750:1 in the region of overlap. Any regions having four CRTs overlapping in a 2×2 matrix, will show a quadrupling in brightness and thus a reduction in contrast ratio to a mere 375:1. This is observable and generally objectionable in the industry.

Attempts have been made to hide such artifacts, one such example being raising the regions of non-overlap to the same brightness levels as the regions of overlap. Such practices are usually implemented by adjusting the input video level to obliterate the visibility of the regions of overlap. However, this method reduces the contrast ratio over the entire display, even in areas where only a single projector projects its image content. And in cases where multiple CRTs or other imaging devices overlap their imagery, the contrast ratio over the entire display will be compromised accordingly.

What is desired is a fall-off in intensity of black and white levels such that the superposed images produce a uniform luminance from center to edges, including the overlapped regions of the projected image. In practice, such an ideal luminance profile is difficult to achieve, as the displays generally exhibit a fall-off in intensity from the center of a displayed image to its edges. To attain a uniform, center to edge luminance profile requires clipping the display's native intensity at display center and elsewhere to the same value as at the edges. Unfortunately, this will result in the loss of the display's native brightness and will significantly reduce the power to image brightness conversion efficiency of the system. Another method based on insensitivity of human vision to low spatial frequency changes is to allow a fall-off of the luminance profile near the edges of the tiled image. In theory, such profiles can be achieved electronically by adjusting the video going into each display. The corrective functions can be multiplied by the image content and will result in a uniform output over much of the gray scales to be rendered. However, the closer the input image approaches the black state, the more the actual deviates from the ideal using this method. This is because the input video commanding a black state on the display does not achieve a true black state in practice. This, as was explained above, is because display technologies generally pass or emit light even when displaying black.

To overcome the limitations described above, a pending commonly assigned patent application to Chen et al, suggest using an optical function generator to generate a spatial gradient profile, then to apply the spatial gradient profile to a spatial filter and then to dispose the spatial filter anywhere in an image formation path of each of the displays to produce a seamless tiled display image.

Generally, tiled displays require periodic re-calibration because the performance of their projectors and/or other hardware tend to change over time. To overcome this problem commonly assigned pending patent applications to Chen et al, suggest a method and apparatus to calibrate tiled displays not including spatial filters in their projectors. However, the method and apparatus disclosed in the pending patent application does not lend itself to calibrate the tiled displays including spatial filters in their projectors because the spatial filters generally change the luminance characteristics around the edges of the display. This can affect the displaying of a template used in the calibration process. Therefore, there is a need in the art for a method and apparatus to calibrate tiled displays including spatial filters in their projectors.

Also, the pending patent applications disclose a method and apparatus that requires a lot of memory and hardware to calibrate the tiled displays. Therefore, there is also a need in the art for a method and apparatus that requires less memory, less hardware, and has an improved processing speed to produce a high-resolution tiled image.

SUMMARY OF THE INVENTION

According to one aspect of the present invention, a method of calibrating a seamless tiled display image having multiple overlapping discrete images produced by multiple displays generates a display-to-screen spatial transformation function to reduce one or more undesirable geometric projector characteristics, for each of the projectors used in the tiled display. The method generates a screen-to-camera spatial transformation function to reduce one or more undesirable geometric camera characteristics for each of the cameras used in capturing the displayed images. The method requires generating a spatial luminance transformation function for effective color calibration for each of the display images in the tiled display. The method further requires inputting a high-resolution image into a tiled display processor to form the tiled images of the tiled display, and segmenting the inputted high-resolution image to form tiled images based on an array of images used in the tiled display. The method requires pre-warping the segmented tiled images using the display-to-screen spatial transformation function to reduce the one or more undesirable geometric projector characteristics. The method requires applying an inverse of the spatial-luminance transformation function to each of the pre-warped images to effectively blend colors in the tiled display images.

Other aspects of the invention will be apparent on reading the following detailed description of the invention and viewing the drawings that form a part thereof.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description is, therefore, not to be taken in a limiting sense, and the scope of the present invention is defined by the appended claims and their equivalents.

This document describes, among other things, a method and an apparatus for performing an electronic calibration on a tiled display system to reduce geometric distortion between screen-to-camera and projector-to-screen and color distortion to effectively blend colors in the display images of the tiled display.

Figure 1:
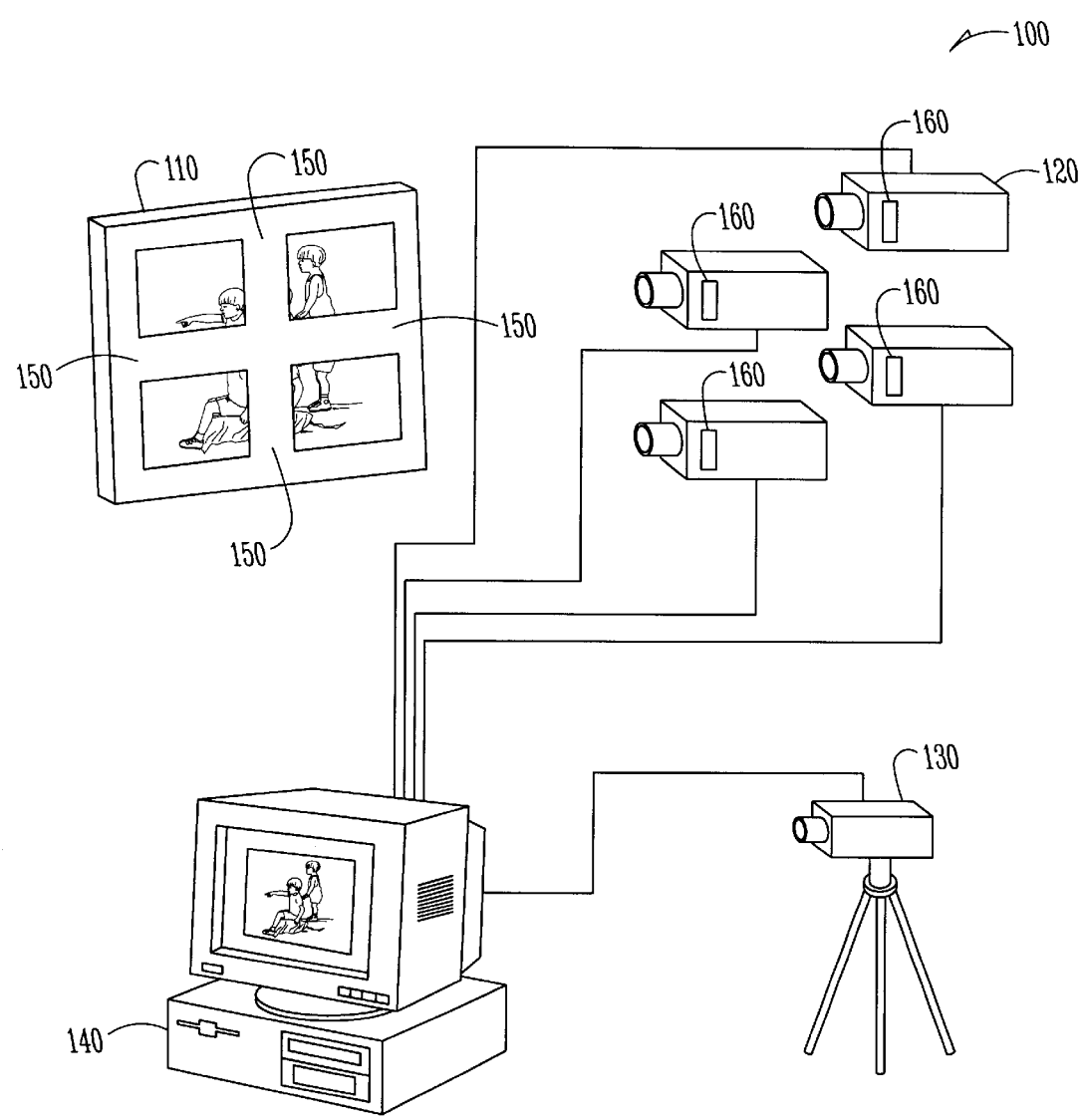
FIG. 1 is a schematic diagram showing a tiled display system used to calibrate and generate a two by two array of images according to the present invention.

FIG. 1 is a schematic diagram illustrating generally by way of example, but not by way of limitation, one embodiment of a tiled display system 100 according to the present invention. System 100 includes a two-by-two array of projectors 120 projecting images on to a display screen 110. Each of the two-by-two arrays of projectors 120 includes a spatial filter 160 to produce a seamless tiled display image on to the screen 110. The spatial filter 160 includes a spatial gradient profile to produce a seamless tiled display image. Spatial filter 160 can be disposed anywhere in an image formation path between each of the two-by-two array of projectors 120 and the screen 110. A camera 130 is coupled to a tiled display processor 140. In one embodiment, camera 130 can be one or more cameras.

In the system 100 shown in FIG. 1, the projectors 120 are arranged so that the images displayed on the screen have roughly similar size, overlap 150 and minimal spatial distortion. Generally, this manual coarse adjustment is quick and easy. In order to achieve a seamless tiled display image, each image has to be further calibrated before the images are sent to two-by-two array of projectors 120. This calibration is generally a fine adjustment to the projectors 120 and the camera 130. This is generally accomplished by doing an electronic calibration on the projectors 120, screen 110 and the camera 130. The purpose of the electronic calibration is to align the tiled images on the screen 110, blend tiled images seamlessly from one tiled image to another tiled image, and to reduce any luminance and chrominance variations inevitably left behind by the coarse manual adjustment. Although, it is possible to partially calibrate the tiled display system 100 by modifying optical components in each of the projectors 120, it is generally subject to time, temperature and other variations, making the coarse manual adjustment process impractical to implement. The tiled display system 100 shown in FIG. 1, automatically calibrates, controls and provides a seamless tiled display using image processing techniques described below.

Figure 2:
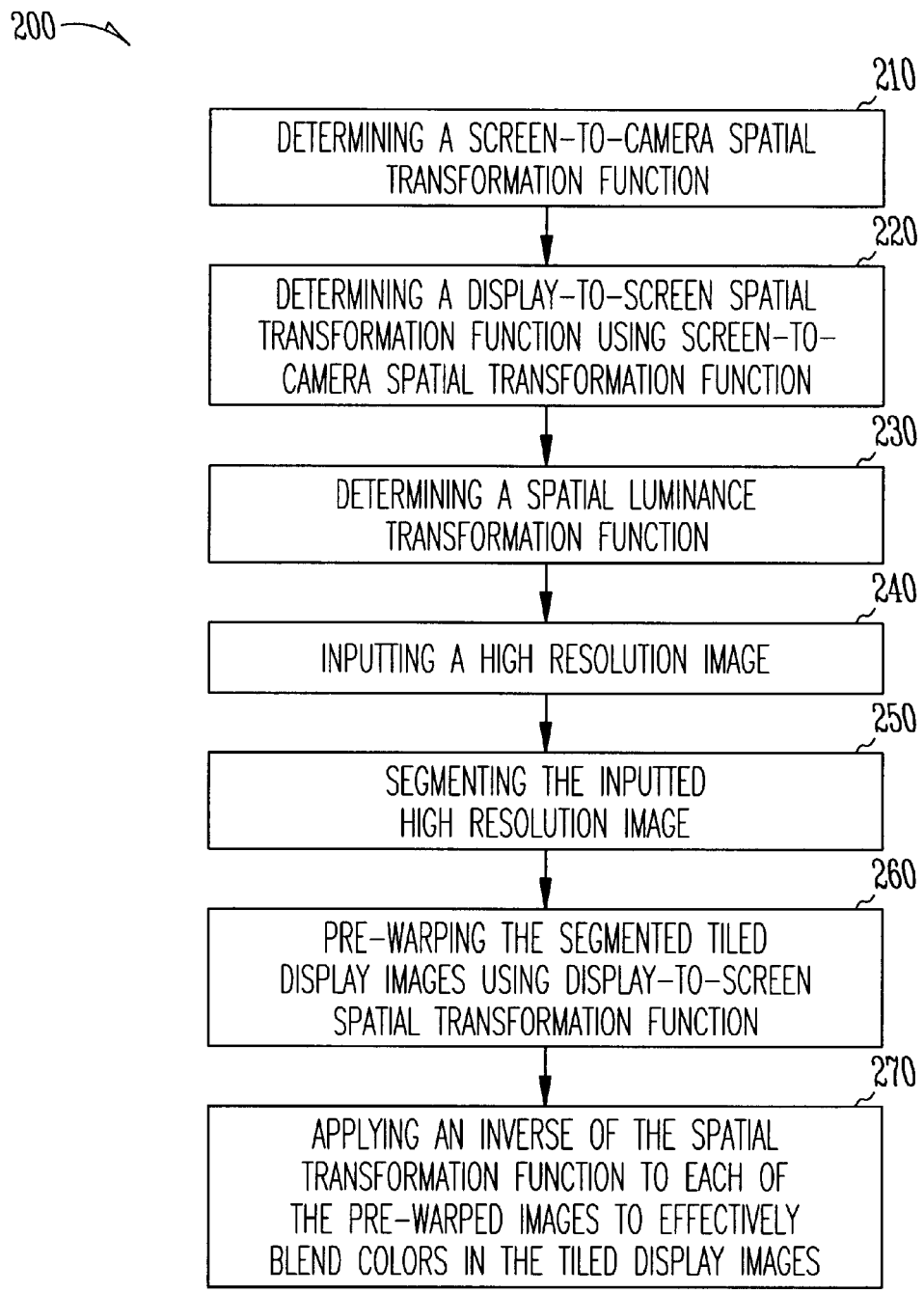
FIG. 2 illustrates a flow diagram of an electronic calibration process for a seamless tiled display system according to the present invention.
Figure 3:
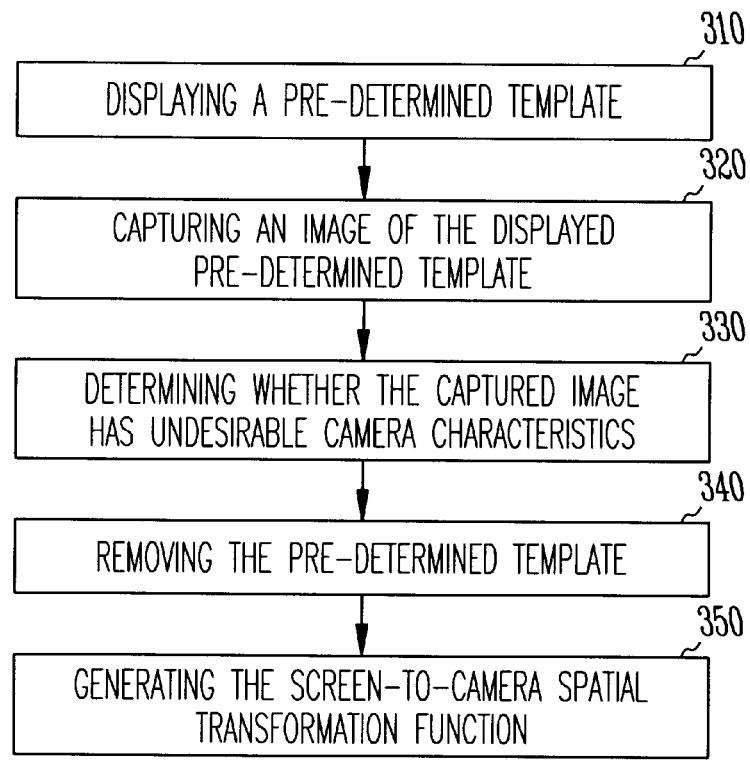
FIG. 3 illustrates a flow diagram of generating a screen-to-camera spatial transformation function according to the present invention.
Figure 6:
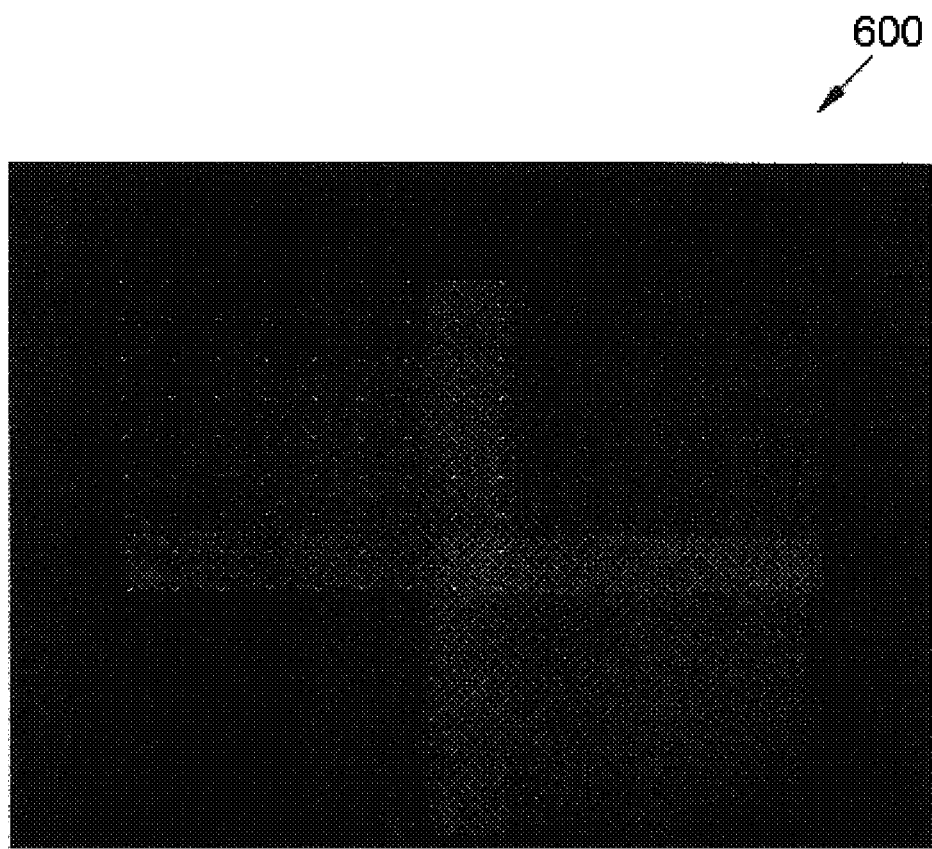
FIG. 6 illustrates a nine by nine dot pattern used in geometric distortion calibration.

FIG. 2 is a flow diagram illustrating generally a method 200 of doing an electronic calibration on a tiled display system to produce a seamless tiled display image. Method 200 includes determining a screen-to-camera spatial transformation function 210. FIG. 3 illustrates one method 210 of determining a screen-to-camera spatial transformation function. Method 210 includes displaying a predetermined template on to the screen 310. Displaying the predetermined template can include disposing a physical predetermined template on to the screen. Alternatively, displaying the predetermined template can be achieved by generating the predetermined template by the tiled display processor and displaying on the screen. In this embodiment, the predetermined template is a dot pattern such as a 9×9 dot pattern 600 as shown in FIG. 6. The next steps 320 and 330 include capturing the image of the displayed predetermined template using a camera and determining to see whether the captured image has one or more undesirable camera characteristics. The step of determining to see whether the captured image has one or more undesirable camera characteristics further includes comparing the captured image to a predetermined expected template to determine whether the captured image has the one or more undesirable characteristics. The next step 340 can include removing the predetermined template from the screen. The next step 350 includes generating a screen-to-camera spatial transformation function that can be applied to a captured image of the tiled display to reduce the one or more undesirable camera characteristics.

Figure 4:
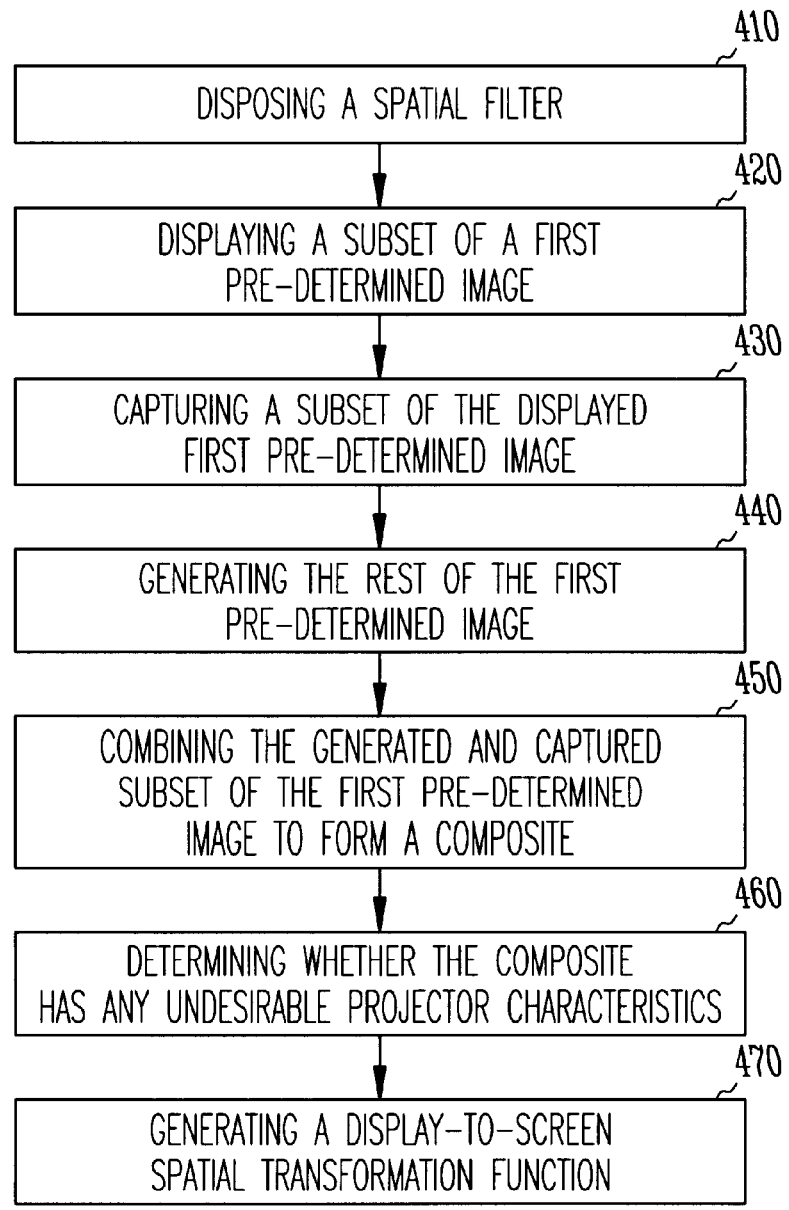
FIG. 4 illustrates a flow diagram of generating a display-to-screen spatial transformation function according to the present invention.
Figure 7:
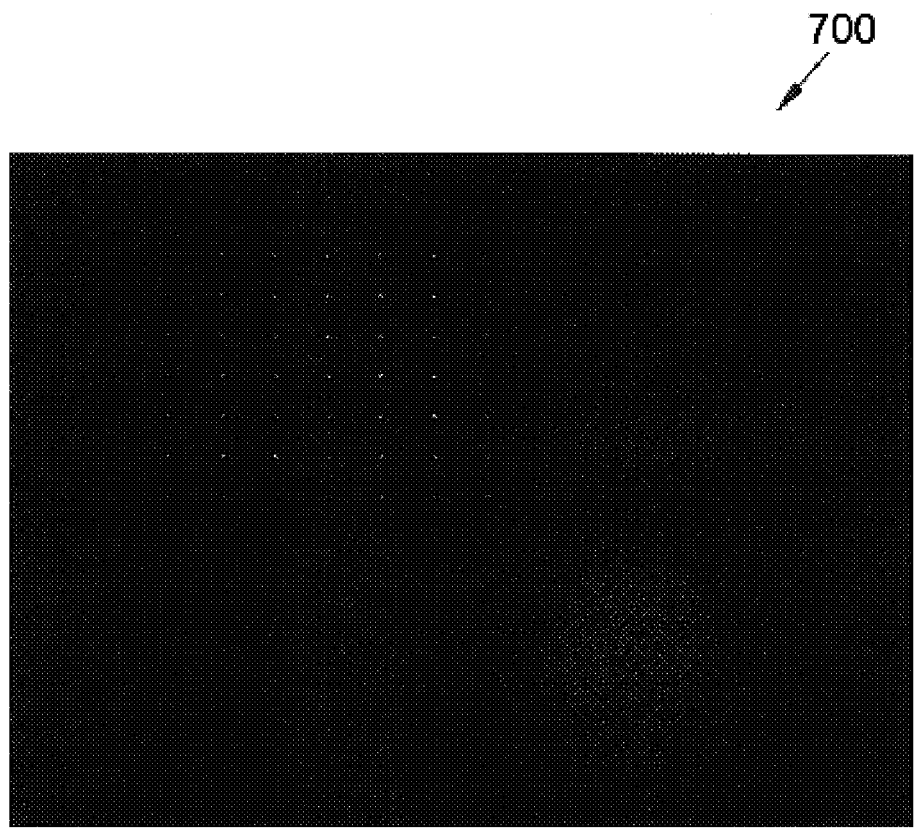
FIG. 7 illustrates a resulting dot pattern when using a spatial filter in an image formation path of the display.

Step 220 in the process 200 determines a display-to-screen spatial transformation function using the previously determined screen-to-camera spatial transformation function 210. FIG. 4 illustrates one method 220 of determining the display-to-screen spatial transformation function. The method 220 includes disposing a spatial filter anywhere in an image path between the projector and the screen to modulate light to produce the seamless tiled display 410. The next step 420 includes displaying a subset of a first predetermined image on to a screen using a projector. The projector can be one or more projectors and the camera can be one or more cameras. In this example, the first predetermined image is a predetermined dot pattern such as a 9×9 dot pattern 600 shown in FIG. 6. The subset of the first predetermined image can be a 7×7 dot pattern 700 shown in FIG. 7. This is due to the application of a spatial luminance profile on to the spatial filter to produce a seamless tiled display. The next step can include applying the screen-to-camera spatial transformation function to correct the captured image for screen-to-camera geometric. The next step 430 includes capturing the partially displayed first predetermined image using a camera. The next step 440 includes generating the rest of the first predetermined image not displayed on the screen due to the inclusion of the spatial filter between the projector and the screen. Generating the rest of the first predetermined image can include using an extrapolation function to generate edge dots of the 9×9 dot pattern not displayed due to the spatial filter in the image path between the projector and the screen. The extrapolation function can be a least squares fit of a polynomial function. The extrapolating function to generate the edge dots can be based on functions such as a quadratic or a higher order polynomial function, or a cubic-spline function. The captured subset of the first predetermined image is then combined with the generated portion of the rest of the predetermined image to form a composite of the first predetermined image 450. The next step 460 includes determining whether the formed composite of the first predetermined image has one or more undesirable projector characteristics by comparing the formed first predetermined image with a predetermined expectation. In some embodiments, comparing the formed first predetermined image with a predetermined expectation includes calculating dot locations by subtracting a black captured image from a captured image and sorting the calculated dots with known locations of the predetermined expected dot pattern. The next step 470 includes generating a display-to-screen spatial transformation function that can be applied to an input video signal of the projector to reduce the undesirable projector characteristics. The input video signal is processed using the display-to-screen spatial transformation function to provide a first transformed input video signal to reduce the one or more undesirable projector characteristics. The steps of capturing, determining and processing can be repeated periodically.

Figure 5:
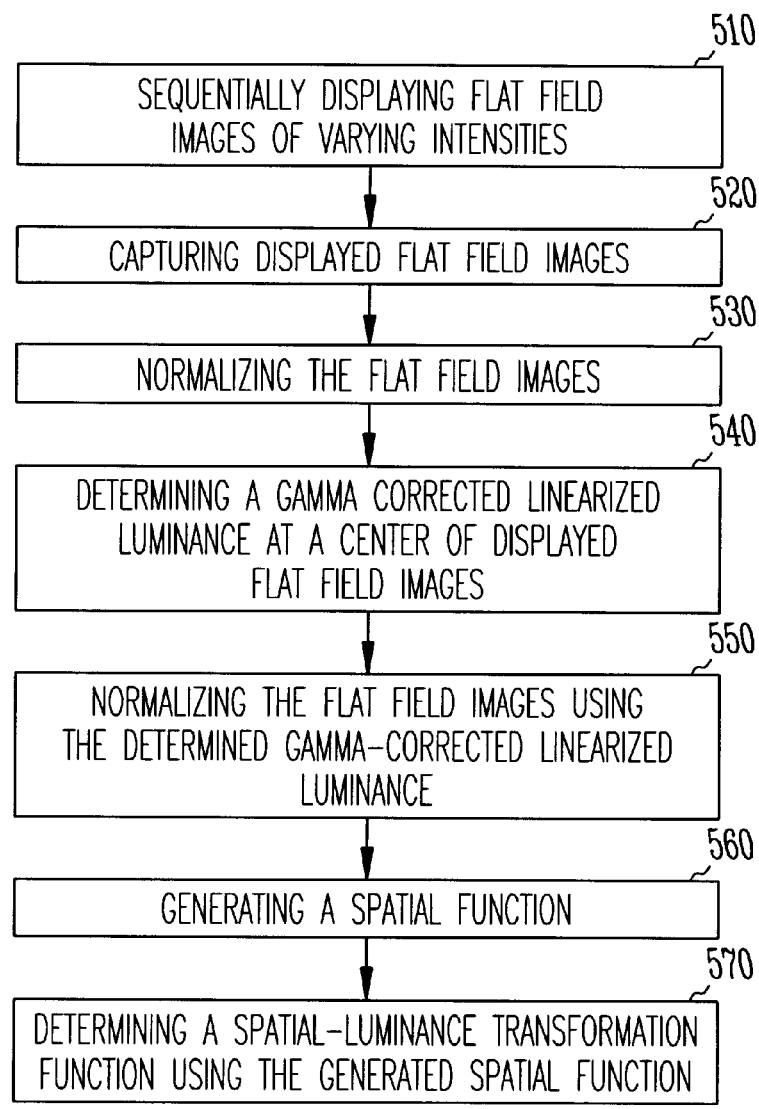
FIG. 5 illustrates a flow diagram of generating a spatial-luminance transformation function according to the present invention.

The next step 230 in the process 200 is to determine a spatial luminance transformation function for providing an effective color calibration. FIG. 5 illustrates one method 230 of determining the spatial luminance transformation function. The method 230 includes the step 510 of sequentially displaying flat field images of varying intensities using the each of the projectors used in the tiled display system. Sequentially displaying flat field images includes displaying flat field images in red, green and blue primary colors with different gray scales. In another embodiment, sequentially displaying flat field images of varying intensities further defines gray scale levels of flat field images of varying intensities, and inputting signal that correspond to the defined gray scale levels of the flat field images of varying intensities. The next steps 520 and 530 in determining the spatial luminance transformation function include capturing displayed flat field images of varying intensities using the camera used in the tiled display system, and normalizing the captured flat field images with respect to the highest and lowest flat field images. The captured flat field images of varying intensities can be corrected for screen-to-camera distortion by applying the screen-to-camera spatial transformation function. Normalizing the captured flat field images can further include geometrically warping back the flat field images to a rectangular coordinate system using the display-to-screen spatial transformation function, with a camera measured luminance as L(x,y) at a pixel position x and y. The gray level and the camera luminance are normalized with respect to their highest and lowest values. In one embodiment, the highest and lowest gray scale values are 255 and 0, respectively. The camera luminance is normalized as $$\overline{L}(x, y) = \frac{L(x, y) - L_{\min}(x, y)}{L_{\max}(x, y) - L_{\min}(x, y)}$$

where $L_{max}(x,y)$ and $L_{min}(x,y)$ are the luminance captured at $D_{ref}$=255 and 0. The normalization process simplifies the algorithm and can accommodate a simpler hardware design for different color depths such as 24 or 30 bits. The normalization also separates fast varying components such as a light source, a light integrator or a condenser from slowly varying components such as non-uniform light valve transmission and the projector optical system.

The next steps 540 and 550 include determining a gamma-corrected linearized luminance at a center of the displayed flat field images of varying intensities, and normalizing the flat field images with the gamma-corrected linearized luminance at the center of the displayed flat field images of varying intensities by computing the reference gray level as $\overline{L}_{ref,\,center} = S_{center}(\overline{D}_{ref}) = \overline{D}'_{ref}$, where $\overline{D}'_{ref}$ is the reference gray level in gamma corrected space and $S_{center}^{-1}(\overline{D}'_{ref}) = \overline{D}_{ref}$ is the inverse function that is applied to transform the image from the gamma-corrected space to the original space. The inverse gamma function is usually represented as discrete values, for example, eight or ten bit depth for each of the red, green, and blue colors. The input $\overline{D}'_{ref}$ and corresponding output $D_{ref}$ values in discrete format are implemented in the hardware as a look-up-table for the gamma correction function to simplify the hardware implementation. Generally, it is difficult to do an inverse of a mathematical function such as the one described above using hardware. The use of a table simplifies the hardware design and implementation. The input and output discrete values can be stored in the memory. Although the $\overline{L}(x,y)$ is linearized at the center position with respect to $\overline{D}'_{ref}$, the same gamma transformation function at the center position of the tile $S_{center}$ do not linearize other positions, i.e. $\overline{L}_{ref}(x,y) = S_{x,y}(\overline{D}'_{ref}) = S_{x,y}(S_c^{-1}(\overline{D}'_{ref})) = t_{x,y}(\overline{D}'_{ref})$. In other words, $S_{x,y}S_c^{-1} = t_{x,y} \neq 1$, where $S_{x,y}$ is the gamma transformation function for the pixel position (x, y).

The next step 560 generates a spatial function that can be applied to simulate each of the normalized flat field images and determines the spatial luminance transformation function for providing an effective color calibration. The deviation of the gamma transformation function at off-center positions, $t_{x,y}$, is usually a slowly-varying function and can be approximated by a linear combination of spatial functions $$\overline{L}(x, y) = t_{x,y}(\overline{D}') = \sum_{i=0}^{m} \beta_i(\overline{D}') f_i(x, y),$$

where $\beta_i(\overline{D}')$ are the spatial coefficients for the corresponding functions $f_i(x, y)$. These spatial functions can be either global or local functions depending on the property of the projection system. In this embodiment, the spatial function is characterized as a local bilinear function $$\overline{L}(x, y) =$$

$$t_{x,y}(\overline{D}') = \sum_{i=0}^{m} \beta_i(\overline{D}') f_i(x, y) = \beta_0(\overline{D}')x + \beta_1(\overline{D}')y + \beta_2(\overline{D}')xy + \beta_3(\overline{D}'),$$

where $f_o(x,y) = x$, $f_1(x,y) = y$, $f_2(x,y) = xy$, $f_3(x,y) = 1$, and m=3. Further, the spatial coefficients $\beta_i(\overline{D}')$ can be represented as a linear combination of luminance functions. The next step 570 includes determining the spatial-luminance transformation function by characterizing luminance as a function of pixel position (x,y) and image digital value $\overline{D}'$. The spatial-luminance transformation function can be expressed analytically using a quadratic function as $$\overline{L}(x, y) = t_{x,y}(\overline{D}') = \sum_{j=0}^{n} \left( \sum_{i=0}^{m} c_{ij} f_i(x, y) \right) (\overline{D}')^j,$$

where $c_{ij}$ are the spatial-luminance coefficients. The digital image value of $\overline{D}'$ can then be derived as a standard quadratic function of luminance L at any pixel position (x, y). After the gamma correction with the aid of the table, the digital value D(x, y) is ready for use at the projectors. Other mathematical profiles other than quatratic, such as a higher order polynomial functions, can also be used to characterize the spatial-luminance transformation function.

Determining the spatial-luminance transformation function can further include applying the spatial function to predetermined sections of each of the flat field images, and determining a first set of coefficients (spatial coeffcients $\beta_i(\overline{D}')$) of the spatial function for each of the predetermined sections of each of the flat field images and determining a second set of coefficinets (luminance coefficients $c_{ij}$) for the first set of coefficients that will effectively blend colors in the tiled displays.

Flat field images of varying intensities can include flat field images of monochrome, red, green and blue colors of varying gray scales. The varying intensities are chosen such that the luminance difference between two adjacent sampled intensities are small enough for the linear interpolation in between the varying intensities. Also in this embodiment, the highest and lowest flat field images means flat field images having a gray scale light intensity of 255 and 0, respectively.

The next step 240 in the process 200 includes inputting a high-resolution raw image into the tiled display system. Step 250 includes an adjustment performed on the input raw image. The adjustment segments the high-resolution image to form the tiled images based on the array of images in the tiled display and can further include adding a predetermined overlapping region to each of the segmented images. The next step can include applying a ramping function to the overlapping region of each of the segmented images to ensure a correct proportion of color luminance mix in the overlapping region. In a representative system, the high-resolution raw image has a resolution of 2560×2048 pixels and each of the four, segmented images have a resolution of 1280×1024 pixels.

The next step 260 in the process 200 includes pre-warping each of the segmented tiled images, including processing each of the segmented tiled images using the display-to-screen spatial transformation function to provide a first transformed input video signal to each of the projectors to reduce undesirable projector characteristics.

The next step 270 in the process 200 includes applying an inverse of the spatial-luminance transformation function to each of the pre-warped images to effectively blend the colors in the tiled display images. This can be done by de-normalizing each of the applied pre-warped images, and applying a look-up-table to each of the de-normalized images to provide a second transformed input video signal to each of the projectors.

Figure 8:
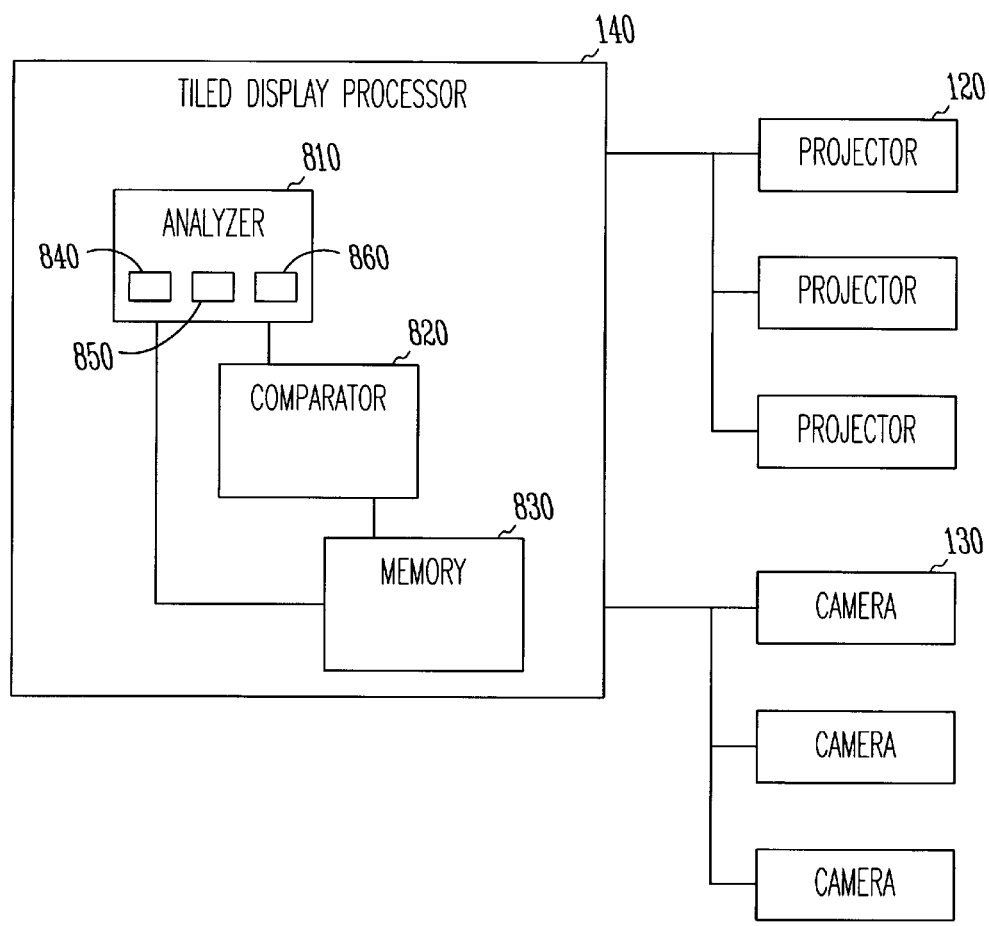
FIG. 8 illustrates one embodiment of a block diagram of a tiled display processor used in the system of FIG. 1.

FIG. 8 shows a block diagram of the tiled display processor 140, including major components and their interconnections to the projectors 120 and to cameras 130. Processor 140 includes an analyzer 810, a comparator 820, and a memory 830. The analyzer 810 includes an image compositor 840, an image warper 850, and an image blender 860. Also shown in FIG. 8, are the projectors 120 and the cameras 130 coupled to the tiled display processor 140.

Figure 9:
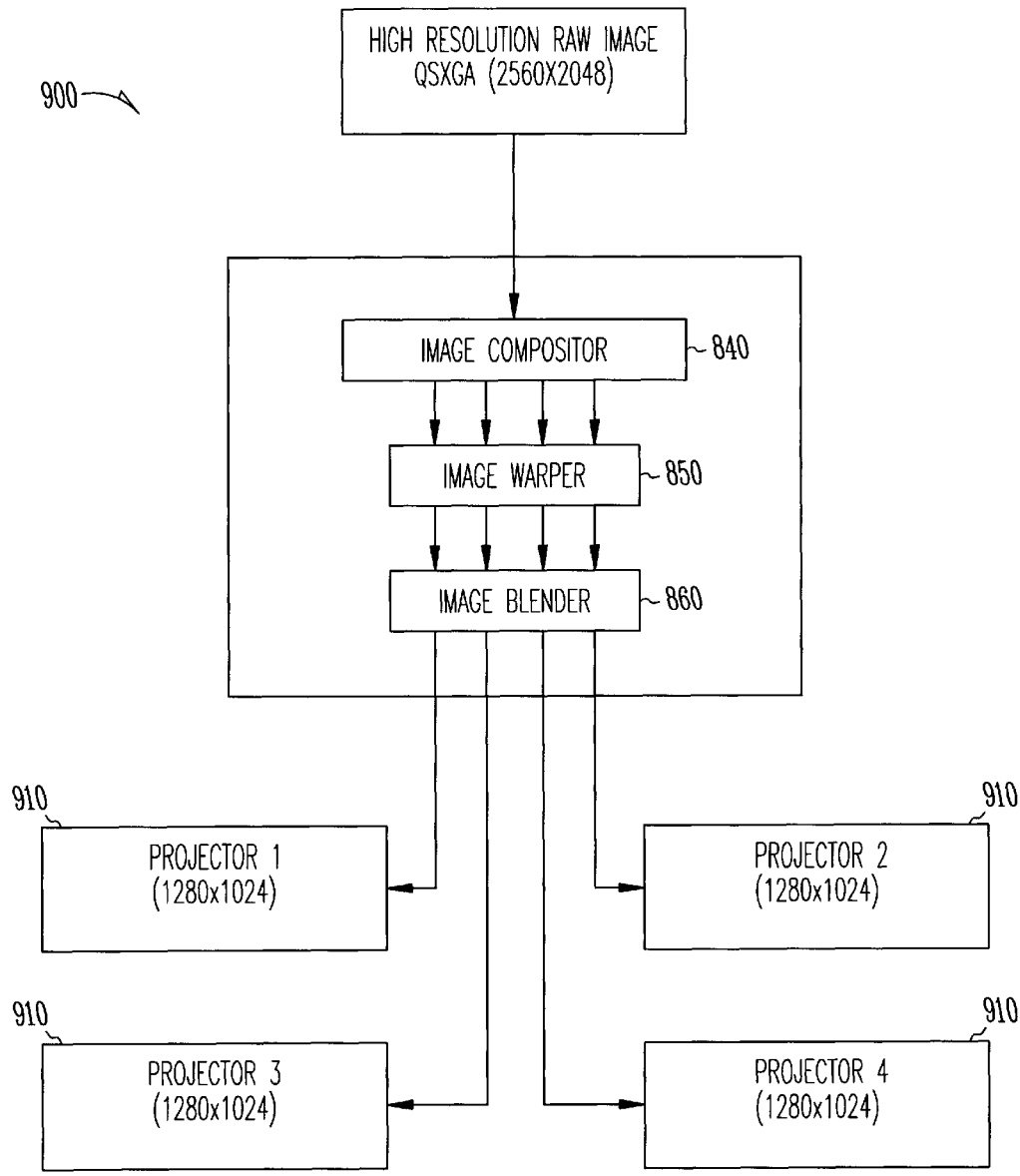
FIG. 9 is a block diagram illustrating the calibration process according to the present invention.

FIG. 9 illustrates one embodiment of segmenting the raw input video signal. In this embodiment, the raw input video signal has a high-resolution of 2560×2048 pixels. In this embodiment the tiled display system 100 has a two-by-two array of tiles. In this embodiment, the analyzer 810 including the image compositor 840 segments the received high-resolution raw image into four images of a predetermined size before sending the segmented images to the respective projectors 120 for further processing. Each of the segmented images contains a certain overlap region 150 as shown in FIG. 1 (the overlap region 150 depends on a projector setup and a desired aspect-ratio arrangement). In the example embodiment shown in FIG. 9, each of the four segmented images has a resolution of 1280×1024 pixels projected by each of the four projectors 910. After segmenting, the image compositor 840 applies a ramping function to the overlap region 150 to ensure a correct proportion of color luminance mixes for each of the segmented images.

The image warper 850 receives the segmented images from the image compositor 840 and pre-warps each of the segmented images before sending the segmented images to the image blender 860 as shown in FIG. 9. Pre-warping is done to align pixels among the adjacent projectors 120, and to correct for optical or mechanical distortions among the projectors 120, the cameras 130 and the screen 110. In one embodiment, the image warper 850 pre-warps the received segmented images, by using a display-to-screen spatial transformation function to provide a first transformed input video signal such that the one or more undesirable projector characteristics are reduced as described in steps 240, 250, 260 and 270. The display-to-screen spatial transformation function is computed using a screen-to-camera spatial transformation function as outlined below.

Each of the projectors 120 displays a predetermined template on to the screen 110. In one embodiment, the predetermined template is a physical template posted on to the screen 110. In another embodiment, the predetermined template is generated by the tiled display processor 140 and projected by each of the projectors 120. Then the camera 130 captures an image of the displayed predetermined template. In one embodiment, the predetermined template is a predetermined dot pattern. In the example embodiment shown in FIG. 4, the predetermined dot pattern is a 9×9 dot pattern. Then the analyzer 810 determines whether the captured image has one or more undesirable camera characteristics. In one embodiment, the tiled display processor includes the comparator 820. In this embodiment, the comparator 820 compares the captured image with a predetermined expected template to determine whether the captured image has one or more undesirable camera characteristics such as key-stone, pin cushion, and barrel distortions. Then the analyzer 810 identifies a screen-to-camera spatial transformation function that can be applied to the input video signal of each of the projectors 120 to reduce the undesirable camera characteristics.

Each of the projectors 120 including the spatial filter 160 displays a subset of a first predetermined image on to the screen 110. Each of the cameras 130 is used to capture the displayed subset of the first predetermined image on the screen 110. Then the analyzer 810 analyzes and corrects the captured image for screen-to-camera geometric distortion by applying the screen-to-camera spatial transformation function as described in step 210. Then the analyzer 810 generates a display-to-screen spatial transformation function that can be applied to an input video signal of each of the projectors 120 to reduce the undesirable projector characteristics as described in step 220. Then the image warper 850 pre-warps the input video signal using the generated display-to-screen spatial transformation function to provide a first transformed input video signal to reduce the one or more undesirable projector characteristics.

The segmented and pre-warped image is then filtered through the image blender 860 using the spatial-luminance transformation function for proper color mixing via a search at each pixel position of each of the projectors 120. The spatial-luminance transformation function is computed using the color distortion calibration process as outlined in step 230. The image blending can be carried out in the following stages:

1. Apply the inverse function of the spatial-luminance transformation function as $$\overline{D}'(x,y) = t_{x,y}^{-1}\left(\frac{I_{input}(x,y)}{255}\right)$$

to the pre-warped first transformed input video signal. The slowly varying function of $t_{x,y}^{-1}$ allows sampling of the local bilinear functions at a much reduced resolution, such as 8×8, 16×16, or 32×32 blocks with the corresponding sets of local bilinear functions. Where $I_{input}$ is the input image of red, green, and blue colors.

2. Denormalize the digital value D' with respect to the maximum $D'_{max}$ and minimum $D'_{min}$ luminance. $D'_{max}$ and $D'_{min}$ are the fast varying function and need much finer sampled resolution than $t_{x,y}^{-1}$ using $$D'(x,y) = \overline{D}'(x,y) \times (D'_{max}(x,y) - D'_{min}(x,y)) + D'_{min}(x,y).$$

Depending on the display characteristics, different sampling resolutions can be used. Blending usually requires full or close to full resolution to ensure a seamless image. With the disposition of the spatial filter 160 in each of the projectors 120, the requirement of close to full resolution is relaxed and a larger sampling period can be used.

3. Apply the look-up-table before feeding the image to the projectors 120 to effectively blend the colors in the tiled images using $$I_{output}(x,y) = 255 \times S_{center}^{-1}(D'(x,y))$$

Where $I_{output}$ is the output image of red, green, and blue colors.

The use of a table can be useful for LCD projectors because of steep transmission-voltage characteristics.

In the overlap region 150, the luminance ramps down smoothly and monotonically from one image to another during color blending. In one embodiment, approximately 80 pixels of overlap are used in the horizontal and vertical directions. Generally, color blending is easier to implement when more overlapping pixels are used. However, more overlapping pixels reduces effective resolution.

The tiled display processor 140 further includes a memory 830. Memory 830 is coupled to the analyzer 810 and comparator 820. In one embodiment, the memory 830 stores the display-to-screen and screen-to-camera transformation coefficients, spatial-luminance transformation coefficients, and the gamma-corrected linearized luminance at the center of the displayed flat field images of varying intensities.

Conclusion

The above described tiled display system provides, among other things, a method and apparatus to calibrate tiled displays including spatial filters in their projectors. Also the tiled display system simplifies the hardware and improves processing speeds.

The above description is intended to be illustrative, and not restrictive. Many other embodiments will be apparent to those of skill in the art. The scope of the invention should therefore be determined with reference to the appended claims, along with the full scope of equivalents to which such claims are entitled.

What is claimed is:

1. A method of calibrating a seamless tiled display, comprising:

disposing a spatial filter in an image path;

displaying a subset of a first predetermined image on a screen using a projector;

capturing the subset of the displayed first predetermined image using a camera;

generating the rest of the first predetermined image not displayed on the screen due to the inclusion of the spatial filter in the image path using the captured subset of the displayed first predetermined image;

combining the captured subset of the first predetermined image with the generated rest of the first predetermined image to form a composite of the first predetermined image;

determining whether the formed composite of the first predetermined image has one or more undesirable projector characteristics; and generating a display-to-screen spatial transformation function that can be applied to an input video signal of the projector to reduce the undesirable projector characteristics.

2. The method of claim 1, further comprising:

processing the input video signal using the display-to-screen spatial transformation function to provide a first transformed input video signal such that the one or more undesirable projector characteristics are reduced.

3. The method of claim 2, further comprising:

comparing the formed composite of the first predetermined image with a predetermined expectation to determine whether the formed composite of the first pre-determined image has the one or more undesirable projector characteristics.

4. The method of claim 2, further comprising:

displaying an image on to the screen; and manually adjusting the projector to have minimal spatial distortion in the displayed image.

5. The method of claim 4, wherein manually adjusting the projector comprises manually adjusting one or more projectors individually to obtain roughly a similar size, an overlap and a minimal spatial distortion of a displayed image.

6. The method of claim 4, wherein the capturing, determining and processing actions are periodically repeated.

7. The method of claim 1, wherein the first predetermined image is a dot pattern.

8. The method of claim 7, wherein generating the rest of the first predetermined image not displayed comprises using an extrapolation function to generate edge dots not displayed due to the disposing of the spatial filter in the image path.

9. The method of claim 8, wherein the extrapolating function comprises a least squares fit of a polynomial function.

10. The method of claim 9, wherein the extrapolating function is selected from the group consisting of a quadratic or a higher order polynomial function and a cubic-spline function.

11. The method of claim 1, which further comprising:

sequentially displaying flat field images of varying intensities using each of multiple projectors used in a tiled display system;

capturing displayed flat field images of varying intensities using the camera;

normalizing the captured flat field images with respect to highest and lowest flat field images for each of the multiple projectors;

determining a gamma-corrected linearized luminance at a center of the displayed flat field images of varying intensities for each of the projectors;

normalizing the flat field images with the determined gamma-corrected linearized luminance at the center of the displayed flat field images of varying intensities for each of the multiple projectors;

generating a spatial function that can be applied to simulate each of the normalized flat field images for each of the multiple projectors; and determining a spatial-luminance transformation function using the spatial function for providing an effective color calibration for each of the multiple projectors.

12. The method of claim 11, wherein sequentially displaying the flat field images of varying intensities using each of the projectors further comprising:

defining gray scale levels of flat field images of varying intensities; and inputting signals that correspond to the defined gray scale levels of the flat field images of varying intensities.

13. The method of claim 11, wherein determining the spatial-luminance transformation function further comprising:

applying the spatial function to predetermined sections of each of the flat field images;

determining a first set of coefficients of the spatial function for each of the predetermined sections of each of the flat field images;

generating the spatial-luminance transformation function that can simulate the determined first set of coefficients for each section of the predetermined sections of the normalized flat field images; and determining a second set of coefficients for the first set of coefficients that will effectively blend colors in the tiled displays.

14. The method of claim 11, wherein the spatial-luminance transformation function is a quadratic or a higher order polynomial function.

15. The method of claim 11, wherein the flat field of varying intensities comprises flat field images of monochrome, red, green and blue colors of varying gray scales.

16. The method of claim 11, which further comprises:

displaying a predetermined template on to the screen;

capturing an image of the displayed predetermined template using the camera;

determining whether the captured image has one or more undesirable camera characteristics;

removing the predetermined template from the screen; and generating a screen-to-camera spatial transformation function that can be applied to the images captured by the camera to correct for the one or more undesirable camera characteristics.

17. The method of claim 16, further comprising:

applying the screen-to-camera spatial transformation function to the captured subset of the displayed first predetermined image to reduce the one or more undesirable camera characteristics.

18. The method of claim 16, further comprising:

comparing the captured image with a predetermined expectation template to determine whether the captured image has the one or more undesirable camera characteristics.

19. The method of claim 16, wherein displaying a predetermined template on the screen comprises disposing a physical predetermined template on to the screen.

20. The method of claim 19, wherein the predetermined template is a dot pattern.

21. The method of claim 16, further comprising:
segmenting a high-resolution image to form tiled images based on an array of images in the tiled display system;
pre-warping each of the segmented tiled images; and
applying the spatial-luminance transformation function to each of the pre-warped tiled images to blend colors in the tiled display images.

22. The method of claim 21, wherein segmenting a high-resolution image further comprising:
inputting the high-resolution image;
segmenting the high-resolution image to form the tiled images based on the array of images in the tiled display;
adding a predetermined overlapping region to each of the segmented images; and
applying a ramping function to the overlapping region of each of the segmented images to ensure a correct proportion of color luminance mix in the overlapping region.

23. The method of claim 21, wherein pre-warping each of the segmented tiled images further comprising:
processing each of the segmented tiled images using the display-to-screen spatial transformation function to provide a first transformed input video signal to each of the projectors to reduce one or more undesirable projector characteristics.

24. The method of claim 21, wherein applying an inverse of the spatial-luminance transformation function to each of the pre-warped images to blend colors in the tiled display images further comprising:
applying an inverse of the spatial-luminance transformation function to each of the pre-warped images;
de-normalizing each of the applied pre-warped images; and
applying a look-up table to each of the de-normalized images to provide a second transformed input video signal to each of the one or more projectors, respectively.

25. A method of reducing one or more undesirable characteristics in a tiled display system, comprising:
generating an image of a predetermined dot pattern;
displaying the generated image of the predetermined dot pattern on to a screen using a projector including a spatial filter to modulate light to produce a seamless tiled display;
capturing the displayed image of the predetermined dot pattern using a camera;
comparing the captured predetermined dot pattern with a predetermined expected dot pattern to determine whether the formed predetermined dot pattern has the one or more undesirable projector characteristics;
generating a display-to-screen spatial transformation function that can be applied to an input video signal of the projector to reduce the undesirable projector characteristics; and
processing the input video signal using the display-to-screen spatial transformation function to provide a first transformed input video signal such that the one or more undesirable projector characteristics are reduced.

26. The method of claim 25, wherein comparing the captured predetermined dot pattern with a predetermined expected dot pattern further comprising:
calculating dot locations by subtracting a black captured image from the captured image; and
sorting the calculated dot locations with known dot locations of the predetermined expected dot pattern.

27. The method of claim 26, wherein generating the display-to-screen spatial transformation function comprises generating the display-to-screen spatial transformation function based on an outcome of sorting the calculated dot locations with the known dot locations.

28. A seamless tiled display system, comprising:
a spatial filter including a spatial gradient profile disposed in an image path between each of multiple projectors and a screen, respectively to produce a seamless tiled display;
a camera for capturing a displayed subset of a first predetermined image by each of the multiple projectors; and
a tiled display processor, coupled to each of the multiple projectors and the camera, wherein the tiled display processor further comprises:
an analyzer to generate the rest of the first predetermined image that is not displayed due to the disposition of the spatial filter in the image path between the projector and the screen, wherein the analyzer combines the generated first predetermined image with the captured subset of the first predetermined image to form a composite of the first predetermined image, wherein the analyzer determines whether the formed composite first predetermined image has one or more undesirable projector characteristics, and the analyzer further
identifies a display-to-screen spatial transformation function that can be applied to an input video signal of the projector to reduce the undesirable projector characteristics; and
processes the input video signal using the identified display-to-screen spatial transformation function to provide a first transformed input video signal such that the one or more undesirable projector characteristics are reduced.

29. The system of claim 28, wherein the processor further comprises a comparator coupled to the analyzer to receive the formed composite of the first predetermined image from the analyzer and to compare the received formed composite of the first predetermined image with a predetermined expectation to determine whether the formed composite of the first predetermined image has the one or more undesirable projector characteristics.

30. The system of claim 28, wherein the first predetermined image is a dot pattern.

31. The system of claim 28, wherein the analyzer generates the rest of the first predetermined image using an extrapolation function.

32. The system of claim 31, wherein the extrapolation function comprises a least squares fit of a polynomial function.

33. The system of claim 32, wherein the extrapolation function is selected from the group consisting of a quadratic or a higher order polynomial function and a cubic-spline function.

34. The system of claim 28, wherein the analyzer further displays flat field images of varying intensities using the projector, and the camera captures the displayed flat field images of varying intensities;
normalizes the captured flat field images with respect to a highest gray scale flat field image and a lowest gray scale flat field image and determines a gamma-corrected linearized luminance at a center of the displayed flat field images of varying intensities, and further normalizes the flat field images with the determined gamma-corrected linearized luminance at the center of the displayed flat field images of varying intensities; and identifies a spatial function that can be applied to simulate each of the normalized flat field images and determines a spatial-luminance transformation function using the spatial function for providing an effective color calibration.

35. The system of claim 34, wherein the analyzer determines the spatial-luminance transformation function by applying spatial function to predetermined sections of each of the flat field images;

determines a first set of coefficients of the spatial function for each of the flat field images, and further identifies the spatial-luminance transformation function that can simulate the determined first set of coefficients for each section of the predetermined section of the normalized flat field images; and determines a second set of coefficients for the first set of coefficients that will effectively blend colors in the tiled displays.

36. The system of claim 35, wherein the spatial function is a local bilinear function.

37. The system of claim 36, wherein the spatial-luminance transformation function is a quadratic or a higher order polynomial function.

38. The system of claim 36, wherein the flat field images of varying intensities comprises flat field images of monochrome, red, green and blue colors of varying gray scales.

39. The system of claim 36, wherein the tiled display processor further comprises a memory, coupled to the analyzer and the comparator, to store gamma-corrected linearized luminance at the center of the displayed flat field images of varying intensities and a look-up-table for the spatial-luminance transformation function.

40. The system of claim 36, wherein the projector further displays a predetermined template on to the screen, the camera further captures an image of the displayed predetermined template, and the analyzer further determines whether the captured image has one or more undesirable camera characteristics, and generates a screen-to-camera spatial transformation function to reduce the one or more undesirable camera characteristics.

41. The system of claim 40, wherein the analyzer applies the screen-to-camera spatial transformation function to the captured subset of the first predetermined image to reduce the one or more undesirable camera characteristics.

42. The system of claim 40, wherein the predetermined template is a dot pattern.

43. The system of claim 40, wherein the analyzer segments a high-resolution image into tiled images based on an array of displayed images and regions of overlap between the arrays of displayed images of the tiled system;

pre-warps each of the segmented tiled images; and applies the spatial-luminance transformation function to each of the pre-warped tiled images to effectively blend colors in the tiled displays.

44. The system of claim 43, wherein the analyzer further segments the high-resolution image into the tiled displays by adding a predetermined overlapping region to each of the segmented tiled images; and applies a ramping function to the overlapping region of each of the segmented tiled images to ensure a correct proportion of color luminance mix in the overlapping region.

45. The seamless tiled display system of claim 43, wherein the analyzer further pre-warps each of the segmented tiled images by processing each of the segmented tiled images using the display-to-screen spatial transformation function to provide a first transformed input video signal such that the one or more undesirable projector characteristics are reduced.

46. The seamless tiled display system of claim 45, wherein the analyzer further applies an inverse of the spatial-luminance transformation function to each of the pre-warped images;

de-normalizes each of the applied pre-warped images; and applies a look-up table to each of the de-normalized images before inputting each of the images into the one or more projectors to blend colors in the tiled display images.

* * * * *